(12) United States Patent
Balembois et al.

(10) Patent No.: US 8,625,192 B2
(45) Date of Patent: Jan. 7, 2014

(54) OPTICAL AMPLIFIER SYSTEM FOR PULSED LASER BASED ON A GUIDING GAIN MEDIUM AND PULSED LASER COMPRISING SAME

(75) Inventors: Francois Daniel Balembois, Boissy le Sec (FR); Patrick Marcel Georges, Noisy le Roi (FR); Damien Sangla, Antony (FR); Julien Didierjean, Caluire (FR)

(73) Assignees: Fibercryst, Villeurbanne (FR), part interest; Centre National de la Recherche Scientifique, Paris (FR), part interest; Universite Claude Bernard Lyon 1, Villeurbanne (FR), part interest ( * ) Notice: Subject to any disclaimer, the term of this patent is extended or adjusted under 35 U.S.C. 154(b) by 250 days.

(21) Appl. No.: 13/124,440

(22) PCT Filed: Oct. 15, 2009

(86) PCT No.: PCT/FR2009/051973
§ 371 (c)(1),
(2), (4) Date: Apr. 15, 2011

(87) PCT Pub. No.: WO2010/043822
PCT Pub. Date: Apr. 22, 2010

(65) Prior Publication Data
US 2011/0200063 A1    Aug. 18, 2011

(30) Foreign Application Priority Data
Oct. 16, 2008  (FR) ...................................... 08 57040

(51) Int. Cl.
*H01S 3/094*      (2006.01)
(52) U.S. Cl.
CPC ..... *H01S 3/094057* (2013.01); *H01S 3/094038* (2013.01); *H01S 3/094003* (2013.01)
USPC ........................................ 359/341.3; 359/349
(58) Field of Classification Search
CPC . H01S 3/2333; H01S 3/094; H01S 3/094003; H01S 3/094038; H01S 3/094057
USPC ................................................ 359/349, 341.3
See application file for complete search history.

(56) References Cited

U.S. PATENT DOCUMENTS 3,852,684 A * 12/1974 Roess et al. ..................... 372/19
(Continued)

FOREIGN PATENT DOCUMENTS

EP    1703601 A    9/2006
(Continued)

OTHER PUBLICATIONS

Digonnet MJ F et al: "Clad ND: Yag Fibers for Laser Applications", Journal of Lightwave Technology, May 1987, pp. 642-646, vol. LT-5, No. 5, XP000915539.
(Continued)

*Primary Examiner* — Mark Hellner
*Assistant Examiner* — Ari M Diacou
(74) *Attorney, Agent, or Firm* — Young & Thompson

(57) ABSTRACT

An optical amplifier for pulsed laser with short or ultra-short and energetic pulses includes an optical pumping source for generating a pump wave, an elongate amplifying medium including an input interface for receiving an optical signal to be amplified, the medium being able to amplify the optical signal propagating along the amplifying medium and to extract an amplified signal and an optical system for coupling the pump wave in the amplifying medium so as to pump the amplifying medium longitudinally. The amplifying medium has a minimum transverse dimension $\phi_3$ and the optical system focuses the pump wave inside the gain medium, the focused pump wave having a transverse dimension $\phi_6$ which is smaller than the dimension $\phi_3$ of the medium and a smaller numerical aperture than the numerical aperture of the medium, so that the pump wave propagates freely over a part of the amplifying medium and then in a confined manner over a part of the amplifying medium.

17 Claims, 5 Drawing Sheets

(56) References Cited

U.S. PATENT DOCUMENTS

| | | | |
|---|---|---|---|
| 4,197,513 A * | 4/1980 | Bell et al. | 372/12 |
| 4,723,249 A * | 2/1988 | Ouhayoun | 372/32 |
| 4,734,911 A * | 3/1988 | Bruesselbach | 372/21 |
| 4,894,831 A * | 1/1990 | Alfrey | 372/19 |
| 5,069,527 A * | 12/1991 | Johnston et al. | 359/823 |
| 5,353,150 A * | 10/1994 | Mangir et al. | 359/338 |
| 5,425,039 A * | 6/1995 | Hsu et al. | 372/6 |
| 5,555,254 A * | 9/1996 | Injeyan et al. | 372/33 |
| 5,568,309 A * | 10/1996 | Rockwell | 359/338 |
| 5,646,773 A * | 7/1997 | Injeyan et al. | 359/337 |
| 5,696,786 A * | 12/1997 | Durkin et al. | 372/75 |
| 6,094,297 A * | 7/2000 | Injeyan et al. | 359/345 |
| 6,181,463 B1 * | 1/2001 | Galvanauskas et al. | 359/330 |
| 6,301,273 B1 * | 10/2001 | Sanders et al. | 372/6 |
| 6,330,259 B1 * | 12/2001 | Dahm | 372/35 |
| 6,614,975 B2 * | 9/2003 | Richardson et al. | 385/127 |
| 6,625,182 B1 * | 9/2003 | Kuksenkov et al. | 372/19 |
| 6,785,304 B2 * | 8/2004 | Filgas | 372/19 |
| 6,836,607 B2 * | 12/2004 | Dejneka et al. | 385/126 |
| 7,110,174 B2 * | 9/2006 | Dane et al. | 359/423 |
| 7,995,638 B2 * | 8/2011 | Mitchell | 372/71 |
| 2002/0101893 A1 * | 8/2002 | Bruesselbach et al. | 372/41 |
| 2003/0099272 A1 * | 5/2003 | Krupke | 372/75 |
| 2004/0028358 A1 * | 2/2004 | Cremer | 385/123 |
| 2005/0185260 A1 * | 8/2005 | Galvanauskas et al. | 359/341.1 |
| 2005/0243409 A1 * | 11/2005 | Harter et al. | 359/341.1 |
| 2006/0209909 A1 * | 9/2006 | Ota et al. | 372/6 |
| 2007/0098024 A1 * | 5/2007 | Mitchell | 372/10 |
| 2007/0104431 A1 * | 5/2007 | Di Teodoro et al. | 385/123 |
| 2008/0013163 A1 * | 1/2008 | Leonardo et al. | 359/341.31 |
| 2008/0144690 A1 * | 6/2008 | Mitchell | 372/70 |
| 2008/0180787 A1 * | 7/2008 | DiGiovanni et al. | 359/334 |
| 2008/0316593 A1 * | 12/2008 | Adachi | 359/342 |
| 2010/0014543 A1 * | 1/2010 | Ogilvy et al. | 372/19 |
| 2010/0322575 A1 * | 12/2010 | Dong et al. | 385/123 |

FOREIGN PATENT DOCUMENTS

| | | |
|---|---|---|
| EP | 1911967 A | 4/2008 |
| WO | 2006106276 A | 10/2006 |
| WO | 2007051138 A | 5/2007 |

OTHER PUBLICATIONS

Digonnet MJ F et al: "1.064- and 1.32-Um Nd:Yag Single Crystal Fiber Lasers", Journal of Lightwave Technology, Apr. 1, 1986, pp. 454-460, vol. LT-4, No. 4, XP000711116.

International Search Report, dated Feb. 8, 2010, in PCT/FR2009/051973.

* cited by examiner

OPTICAL AMPLIFIER SYSTEM FOR PULSED LASER BASED ON A GUIDING GAIN MEDIUM AND PULSED LASER COMPRISING SAME

BACKGROUND OF THE INVENTION

1. Field of the Invention

The invention relates to an optical amplifier for pulsed laser with short (shorter than 10 nanoseconds) or ultra-short (shorter than 1 picosecond) and energetic (energy higher than 10 microjoules per pulse) pulses.

2. Description of the Related Art

A pulsed laser generally associates an oscillator and an amplifier system to generate both short and energetic pulses. The oscillator generates pulses from one femtosecond to several tens of nanosecond in duration and with a good spatial quality, but the energy of which is generally limited (from a few nanojoules to a few millijoules). To increase the energy delivered by an oscillator, it is necessary to use an amplifier system capable of both greatly increasing the output power and extracting the energy with the best efficiency possible. These two functions required for a good amplifier are, in most cases, antagonistic because it is difficult to obtain both a very high gain and an excellent energy extraction due to phenomena of gain saturation with the incident power.

The key parameter of an amplifier system is the amplification factor, also called "gain". The gain is given by the following formula:

$$G_{eff} = e^{\int_0^{l_c} g(z) \, dz}$$

where $I_c$ is the total length of the gain medium and g is the lineal gain in $m^{-1}$, at the laser wavelength. The lineal gain $g_l$ depends on the "small signal" lineal gain $g_0$ and on the ratio of the laser intensity to be amplified $I_{signal}$ to the saturation intensity $I_{sat}$, according to the following formula:

$$g_l \propto \frac{g_0}{1 + \frac{I_{signal}}{I_{sat}}}$$

The dependence of the gain on the incident laser intensity is thus a fundamental piece of information for the making and the use of an amplifier system, because it determines the potential of an amplifier system for being used as a pre-amplifier or an end-of-chain power amplifier. The average power obtained at the output of the amplifier, which is a limitative parameter in some systems, and the efficiency of an amplifier, will also be considered.

The efficiency is the ratio between the output power and the pump power.

A first solution to optimize the gain and the amplification efficiency consists in implementing several amplifiers in series so as to associate media of different characteristics: a first system called a "pre-amplifier", with a high "small signal" gain, is followed by one or several systems called "power amplifiers", permitting to obtain a high efficiency but having a limited gain. Some systems comprise four amplifiers in series, which is both complex and costly. In order to minimize the number of amplifier components, a compromise has to be made between the two regimes of operation. Numerous high-power amplifier systems are based on multiple passages of the beam in the amplifying medium. These systems are also complex.

Another solution consists in multiplying the passages of the beam in an amplifying medium so as to maximally extract the energy stored. A high gain is necessary in "small signal" regime. In this regime, the quantity of light injected into the amplifier is so small that the amplification factor depends only on the quantity of energy stored. The latter is generally far higher than the incident energy and the energy obtained at the output, and thus the efficiency is low. It is the case, in particular, in the regenerative amplifiers that are active systems in which it is necessary to accurately control the synchronization of the injection and the ejection of the pulse in the so-called "slave" cavity. K. Sueda et al. ("LD pumped Yb:YAG regenerative amplifier for high average power short-pulse generation", Laser Physics Letters 5, 271-275, 2008) have obtained gains higher than 100 in Nd:YVO$_4$ or Yb:YAG crystals, for a pump power higher than 100 W. This solution is certainly high performing, but it is very costly and its implementation is complex. It is also the case for systems that use a set of mirrors to refocus the beam in the gain medium. The signal is thus amplified thanks to multiple passages in the same amplifying area of the medium. However, these multiple-passage systems are very complex.

Various media permit to amplify pulses through one or a few passages (less than 10). Systems based on solids doped with rare earth or metal ions (such as Nd:YVO$_4$), systems based on optically active liquids (as in dye laser), systems based on optically active gaseous media (as the Rubidium), or systems based of doped glass fibres in which the signal to be amplified is guided within the medium to favour the amplification, are known. In particular, to amplify pulses whose wavelength is around 1 μm, the doping with rare earth ions of crystalline or amorphous media, and notably neodymium and ytterbium ions, allows high powers to be generated.

FIG. 1 indicates the performances in terms of gain and average output power for various types of amplifying media associated with various optical pumping systems according to the state of the art. This graph provides a cartography of the different systems. The systems based on crystals are represented by squares and the optical fibre systems by diamonds.

According to the type of amplifying medium, various configurations of optical pumping have been developed.

The geometry of the systems based on bulk crystals strongly depends on the pumping configuration, which is generally transverse or longitudinal.

In case of transverse pumping, an efficient configuration is the "slab" geometry, in which the beam performs round trips inside the gain medium, after reflection on mirrors, so as to extract the maximum of energy and to favour the overlap of the laser mode and the pumped volume. A gain of the order of 2 with an output power of 10 W after two passages has thus been obtained in a Nd:YVO$_4$ crystal. This geometry is favourable to the use of high-power laser diode bars (stack) that can be placed so as to directly pump the medium in the transverse direction. Despite the simplicity of the pumping system, this configuration intrinsically generates a strong dissymmetry and significant thermal lens effects in the medium. In order to limit the beam ellipticity, it is possible to fold the beam so as to multiply the round trips within the crystal. In this case, it is difficult to correctly extract all the gain present in the crystal. The gain obtained is of the order of 2, with an output power of 102 W for a pump power of 100 W. At such pump power, the thermal effects are then very significant and restrict the power increase of this type of system.

In order to reduce the strong thermal lens in this direction, another solution is to force the signal to propagate in this same direction (the smallest direction of the crystal) by "zigzagging" after several internal total reflections on the faces of the medium. A gain of 12.5 and an output power of 2.5 W have thus been obtained in the Nd:YVO$_4$ crystal, for a pump power of 40 W. Shiradan et al. (Applied Optics 46, 7552-7565, 2007) have used such a geometry in a Yb:YAG crystal and have obtained a gain of 20 and a power of 2 W has been demonstrated for a pump of 16 W. Furthermore, the latter configuration has the advantage that it simplifies the system with respect to the previous ones and that it makes it possible to obtain high gains from bulk crystals, but with a relatively limited extraction. Besides, the making of systems in which the signal propagates according to a grazing incidence ("bounce geometry") also makes it possible to limit the thermal effects because the beam reflects on the cooled face. A gain of about 5.8 as well as an output power of 60 W have thus been obtained with a single passage in a Nd:YVO4 crystal. Once again, the advantage of this system is the high output power, but the thermal effects remain a limitative factor for a use toward higher powers.

A longitudinal pumping within a bulk crystal allows an optimal overlap between the pumped area and the area of propagation of the incident beam to obtain the best efficiency, and thus a maximum output power while preserving a significant gain. Power laser diodes whose beam is conformed are excellent pumping sources and allows high brightness to be reached. The power densities in the gain medium may then be very high. Therefore, a careful dimensioning of the pumping optics has permitted to obtain, through a single passage in a Nd:YVO$_4$ crystal pumped at 888 nm, a gain of 2 and an output power of more than 110 W. Moreover, the pumping at 888 nm permits to reduce the thermal effects and to increase the extraction.

FIG. 1 indicates that the high-power amplifiers based on doped crystals permit to reach high extraction efficiencies, but with generally limited gains, lower than 13 and even 2 in the case of an output power of the order of 100 W. The materials used are generally Yb:YAG crystals or neodymium-doped crystals, which are characterised by a great efficient emission cross-section at the laser wavelength, but which are limited in most cases by the thermal phenomena reducing the prospects for power increase. The thermal stabilisation of the gain medium requires the use of crystals of sufficient size to support high powers of pump.

Other optical amplifier systems do not use a bulk crystal but use an amplifying optical fibre. Various types of amplifying optical fibres have been developed, in particular dual-core amorphous doped glass fibre, wide-core fibres and photonic-crystal fibres.

The structure of the dual-core amorphous fibres doped with rare earth ions makes it possible to overcome the thermal problems. In such fibres, the pump wave is guided so as to distribute the absorption over a great volume and thus to restrict the temperature rise. The signal beam is also guided in a multimodal lightly-doped core, which permits to preserve an excellent quality of beam as well as an excellent efficiency, thanks to the perfect overlap between the beams of the signal and of the pump. Thus, the pulse amplification with high gains and through a relatively simple scheme has been demonstrated from optical fibres doped with neodymium or ytterbium ions. Gains of 10 to 20 have been obtained in fibres with a core of less than 11 μm in diameter and of several meters long. However, such amplification is limited by a high rate of amplified spontaneous emission. Besides, the main factors limiting this architecture arise as soon as it is desired to amplify both short (of the order of about ten nanoseconds and less) and energetic (as soon as ten microjoules) pluses. Indeed, the peak power that propagates in the amplifying medium is sufficient to generate strong undesirable non-linear effects such as the Raman effect, the stimulated Brillouin emission, or the self-phase modulation. These effects are the main limitation for the amorphous fibres to reach high average output powers.

In order to limit the undesirable non-linear effects, large core (more than 15 μm in radius) or small-length fibres has been developed. From a fibre of 50 μm in diameter and an injected energy of 4 μJ (a pulse of the order of one nanosecond in duration), 750 μJ at 1 kHz (i.e. 750 mW) have been obtained for a pump of 7 W, i.e. a gain of 190. Cheng et al. (Optics Letters, 30, 358-360, 2005) have used a fibre with a core diameter of 200 μm, having a strongly multimodal emission, to amplify pre-amplified pulses up to 2.7 mJ with a gain of 10. A phosphate fibre with a core of 10 μm in diameter, strongly doped with Yb3+ ions, and with a length limited to only 47 cm, has permitted the making of a relatively simple amplifier with a gain of 28 dB (i.e. a neat gain of 690) and a corresponding output power of 10 W. Such performance corresponds to the highest gain obtained shown in FIG. 1.

The photonic-crystal fibres ("Rod-type"), whose doped-core size varies between 50 and 100 μm in diameter, are also a promising solution. Pulses of 85 picoseconds and 40 mW have been amplified up to 1.5 W in a first fibre-amplifier, then up to 27 W in a photonic-crystal fibre with a core diameter of 70 μm, for a pump of 100 W, with a gain in the very wide core fibre of about 18. These values are very significant and constitute an intermediate solution for obtaining both high gain and high average power. However, this solution requires the use of a relatively complex medium and remains limited to the amplification of pulses whose energy is lower than a few millijoules at most, as a function of the doped-core diameter used, so as to remain under energy density thresholds for the doped glass (about 22 J/cm$^2$ for pulses of 1 ns at the wavelength of 1 μm).

To sum up, the doped glass fibres, whether they are conventional or based on photonic crystal, permit to strongly concentrate the pump and the signal, but also to support high pump powers, while preserving an excellent spatial beam quality. FIG. 1 indicates clearly that the fibre amplifiers permit to obtain the highest gain values. However, their dimensions are, for the moment, limited to cores of a few tens of micrometers. This is a limitative factor for the amplification of high energy (thus of high average powers) pulses, due to the thresholds of occurrence of the non-linear effects and of damage of the glass. This limitation appears in FIG. 1: the average powers of the fibre amplifiers remain lower than 30 W.

The performances obtained in terms of gain and average output power for various types of amplifying media coupled to various pumping systems of the state of the art are illustrated on the graph of FIG. 1. This graph provides a cartography of the different systems. Two general trends can be deduced therefrom. On the one hand, the bulk crystals make it possible to reach high average powers, but with a relatively low gain. On the other hand, the fibres make it possible to reach high gains, but with a limited output power. To sum up, the amplifiers of the state of the art do not permit to obtain high gain and high average power at the same time.

SUMMARY OF THE INVENTION

One object of the invention is to provide an optical-pumping amplifier system that permit to overcome the thermal limitations of the crystal amplifiers as well as the undesirable non-linear effects and the damage thresholds of the doped glass fibres, while being simple to implement.

As used herein, "guiding the pump wave" means the capacity of a medium to confine the pump wave by reflection or by index gradient.

The present invention aims to remedy these drawbacks and more particularly relates to an optical amplifier system for pulsed laser with short or ultra-short and energetic pulses, comprising an optical pumping source able to generate a pump wave, an elongate amplifying medium comprising an input interface able to receive an optical signal to be amplified, said medium being able to amplify said optical signal propagating along said amplifying medium and able to extract an amplified signal, and an optical system able to couple said pump wave in the amplifying medium so as to longitudinally pump said amplifying medium.

According to the invention, the amplifying medium is a gain medium able to guide the pump wave, said amplifying medium having a minimum transverse dimension $\phi_3$ at the input interface, and the optical system is able to focus the pump wave inside the gain medium, said focused pump wave having a transverse dimension $\phi_6$ smaller than the minimum transverse dimension $\phi_3$ and a numerical aperture smaller than the numerical aperture of the amplifying medium, in such a way that said pump wave propagates freely over a first part of the amplifying medium, and that said pump wave propagates in a confined manner over a second part of the amplifying medium.

Advantageously, the amplifying medium is a solid medium doped with rare earth or metal ions.

Preferentially, the amplifying medium is doped with Neodymium or Ytterbium ions.

According to another embodiment of the invention, the amplifying medium comprises an elongated cell containing a gas able to amplify the optical signal by optical pumping.

According to another embodiment of the invention, the amplifying medium comprises an elongated cell containing a liquid comprising particles or molecules able to amplify the optical signal by optical pumping.

According to an embodiment of the invention, the amplifying medium is rotationally symmetric and has a transverse dimension $\phi_3$ greater than 50 µm.

Advantageously, the amplifier medium comprises a core and a clad, the optical signal to be amplified propagating in the core of the amplifying medium.

Advantageously, the optical pumping source and the optical system are able to focus the pump wave in such a manner that said pump wave propagates freely over a length greater than 1 mm of the amplifying medium.

Advantageously, the amplifier system comprises a second optical pumping source able to generate a second pump wave, able to optically pump the second part of the amplifying medium, transversally to the axis of propagation of the signal to be amplified or in a longitudinal and contra-propagative manner with respect to the axis of propagation of the signal to be amplified.

Advantageously, the signal to be amplified performs no more than two passages in the amplifying medium.

The invention also relates to a pulsed laser comprising an oscillator able to emit pulses to be amplified, said laser comprising an amplifier system according to one of the embodiments of the invention.

The invention provides a compact, simple to implement and high-gain system, which makes it possible to combine within a single one object the functions of pre-amplifier and of extraction amplifier.

BRIEF DESCRIPTION OF THE DRAWING FIGURES

The present description is given only by way of non-limitative example and will permit to better understand how the invention can be made, with reference to the appended drawings, in which:

FIG. 1 shows the gain and output power performances of various power amplifiers in pulse regime;

FIG. 2 schematically shows the principle of operation of the amplification and pumping system according to the invention;

DETAILED DESCRIPTION OF THE INVENTION

The invention uses the combination of a guiding gain medium (for the pump wave) and a sufficiently bright pump source to increase both the gain and the amplification efficiency.

Figure 2:
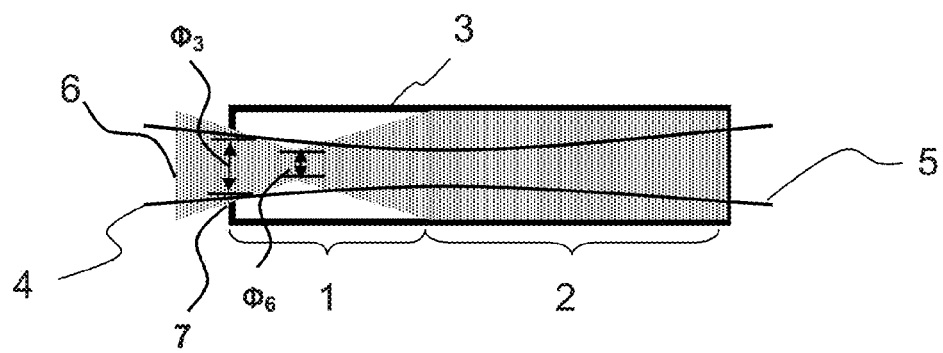

The guiding gain medium 3 may be, for example, a single-crystal fibre or a doped glass optical fibre, or else a gain medium guiding in a transverse direction. The physical dimensions (length and diameter or transverse dimension of the pump guide) of this medium are adapted to the free propagation of the pump wave over a length that is long enough so that the gain medium comprises two well-distinct operating areas: a first area or "pre-amplification area" 1 corresponds to a pre-amplification regime and a second area or "extraction area" 2 corresponds to a regime of power amplification and extraction. This operation is schematically illustrated in FIG. 2, which shows a view in longitudinal section of the gain medium 3 in which propagate a beam 4 to be amplified and a pump wave 6. The combination of the two areas 1 and 2 within a single one amplifying medium 3 makes the system at once compact, simple and efficient because it permits to amplify high-energy pulses with a significant gain, while preserving a high extraction efficiency.

The gain medium 3 is long enough to permit the distribution of the pump wave 6 over a significant volume and thus to avoid the thermal problems. The gain medium 3 may be a single-crystal or amorphous (doped glass) medium. This gain medium 3 guides a pump wave 6, for example by internal total reflections or thanks to the presence of a core-clad structure with an index difference great enough to provide the guidance of the pump beam. The gain medium 3 has also to support high pump and signal power densities because the main interest is the use as a high-power amplifier, i.e. an amplifier liable to support pump powers of several hundreds of watts and peak powers for the signal higher than the megawatts.

An example of medium 3 that is well adapted to the making of this type of amplification system is a gain medium based on doped single-crystal fibre. The properties of a single-crystal fibre used as a laser medium are described in the patent document WO2006106276. The parameters of this type of fibre are particularly well adapted to the use of this fibre with high-power pumping diodes. Indeed, the diameter $\phi_3$ of this medium is comprised between 200 and 1000 µm, which corresponds to the size range of a pump beam coming from a power laser diode currently available on the market. The pump is for example a fibred power laser diode delivering a power of several tens to several hundreds of watts at the output of a fibre of 100 to 400 µm in diameter and 0.22 in numerical aperture (the brightness of the pump is then higher than several hundreds of kW/cm$^2$/sr). The beam coming from this pump is focused inside the gain medium by means of an imaging optical system having a magnifying factor of the order of 1. The pre-amplification area 1 has a length $L_1$ varying from a few millimeters to a few centimeters. For an amplifying medium based on crystalline fibre, a length L1 greater than a few centimeters as well as the excellent distribution thereof of the thermal temperature rise upon the absorption of the pump beam are also significant qualities for this medium.

Figure 1:
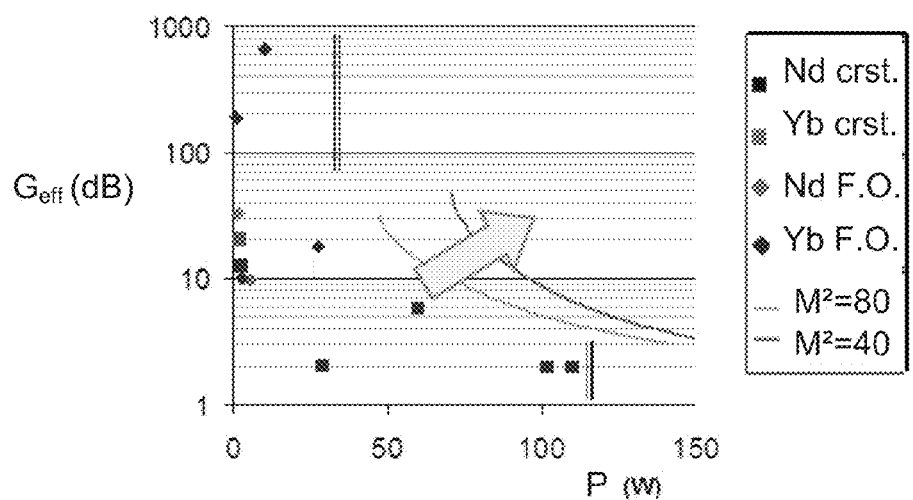

According to a 1$^{st}$ exemplary embodiment, the amplifying medium 3 comprises an ytterbium-doped single-crystal fibre of 700 µm in diameter and 50 mm long. The amplifying medium is pumped by means of a laser diode of 200 W coupled to a transport fibre of 200 µm of core diameter and the pump wave is focused inside the amplifying medium 3 by means of an optical system with a magnification of 1. The association of the two technologies makes it possible to reach the performances shown in FIG. 1 by two curves, as a function of the pump brightness.

As shown in FIG. 2, the medium 3 is functionally composed of two parts along the amplifying medium: a 1$^{st}$ part 1, of pre-amplification, and a 2$^{nd}$ part 2, of amplification-extraction.

The "pre-amplification part" 1 is defined as the volume of the gain medium where the pump wave 6 propagate freely, which permits to focus a good-quality wave pump 6 inside the gain medium 3. This focus permits to obtain a very high power density: for a power of 100 W focused to a diameter $\phi_6$ of 200 µm, the density is higher than 300 kW/cm$^2$. Therefore, the low-power incident beam 4 here undergoes a very high gain (little saturated by the signal) and is highly amplified thanks to the high power density of pump 6.

Figure 3:
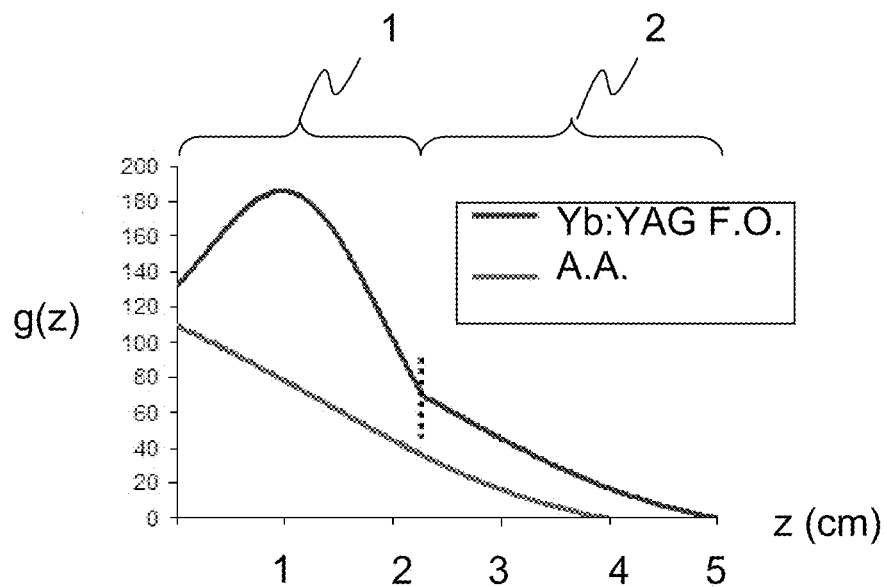
FIG. 3 shows curves of linear gain along the amplifying medium according to the state of the art and according to the invention.

The interest of such an area 1 with respect to a pumping distributed by being guided from the beginning of the amplifier medium (i.e. from the input interface 7 in the medium 3) is illustrated in FIG. 3. In the first part 1, the local increase of the power density induces a very significant increase of the linear gain (i.e. the available gain per medium length unit).

In the "extraction area" 2, the pump wave 6 is distributed over the volume of this area 2, because of the properties of signal guidance from a certain longitudinal coordinate (defined by the choice of the pump optics) along the optical axis. This way, if we suppose that the profile of the pump wave 6 is almost uniform, the gain is homogenized and the dimensions of this area are great enough so that the beam 4 to be amplified has itself a great size, in such a manner that it is not guided in this area 2. The diameter of the beam 4 is of the order of half the diameter of the medium 3, and thus greater than several hundreds of micrometers. Therefore, the amplified power density locally present in this extraction area is greatly reduced. Accordingly, it is possible to go beyond the energy limits the large-core doped fibres can currently support.

In a conventional dual-core optical fibre, in which the signal is guided in a small-size core (a few tens of microns), the optical signal exceeds the threshold of damage (around 20 J/cm$^2$) as soon as the energy of the light pulses exceeds about 1 mJ.

In the invention presented herein, the fact that the optical signal can propagate with a far greater diameter (typically of several hundreds of microns) makes it possible to obtain pulses of several tens of millijoules without reaching the threshold of damage.

The particular case of a doped medium 3 in which the absorption of the pump may be saturated will now be considered. In the pre-amplification area 1, the power density is all the more high in the case of a doping with an ion having a quasi-three-level structure, such as the ytterbium, due to the phenomenon of absorption saturation. Indeed, the pump power 6 remains very high over a longer area during the propagation along the optical axis due to the saturation, and thus the pre-amplification effect is greater. The linear gain in the extraction area 2 is also higher because the pump power 6 then available is higher in this part of the medium 3 with respect to a medium in which the absorption would be distributed. This trend is very marked in FIG. 3. A doping with ions having a quasi-three-level structure is thus particularly interesting because it reinforces the effects described in the previous paragraphs; nevertheless it is not a condition required for a good operation of our invention.

We have attempted to compare the behaviour of the complete system of the invention {Pre-amplification area+Extraction area} to that of the same medium 3, but using only an extraction area 2, i.e. if the pump 6 is immediately guided in the medium 3. In this configuration, the pump transverse profile inside the medium is supposed to be uniform within the whole medium 3.

The simulation of the behaviour of a 50 mm long, 1 mm in diameter, 1% doped, Yb:YAG laser crystal rod (the latter may be, for example, a monocrystalline fibre), excited by a total pump power of 200 W at the input face, and in which the absorption of the pump 6 is distributed along the medium 3 is shown in FIG. 3. In the case of a uniform pumping, the latter may be made homogeneous either by the immediate guidance of the pump signal in the medium or through a "homogenizer" optical system.

The curve (A.A) at the bottom of FIG. 3 shows the lineal gain for a uniform longitudinal pumping of the medium 3.

It is noted that the device of the invention permits to considerably increase the gain values of the medium by means of a geometry making it possible to use two successive gain areas 1 and 2 in a single one medium.

The qualities required for the gain medium 3 have been mentioned hereinabove. The invention being based on the combination of this medium 3 with particular properties (length and transverse dimension), as well as on the use of an optical pumping system, the required quality for the pump beam in order to reach the best performances, i.e. the brightness thereof, will now be described in detail.

If the power of the pump source 9 is fixed, studying the effect of the brightness amounts to examining the spatial quality of the pump beam 6. The latter may be evaluated by the quality factor M$^2$ that permits to evaluate the way a beam diverges with respect to an ideal Gaussian beam, which has a quality factor $M^2$ equal to 1. This quality factor $M^2$ of the pump beam is given by the following formula:

$$M^2 = \frac{\pi \cdot \omega_0 \cdot \theta}{\lambda}$$

where $\lambda$ is the pump wavelength, $\omega_0$ is the beam size imparted by the radius of the carrier fibre, and $\theta$ is the divergence of the beam. The fibred power laser diodes currently available have a factor $M^2$ comprised between 20 and 200.

Figure 5:
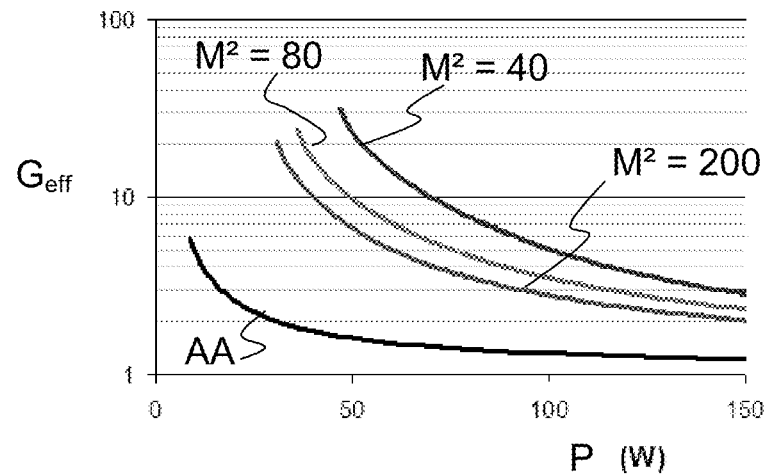
FIG. 5 shows simulations of curves of effective gain as a function of the output power obtained for various pump configurations.

By way of comparison, FIG. 5 illustrates various curves of effective gain as a function of the power that can be obtained at the output of the previously used pumping configuration and by varying the parameter $M^2$, with $M^2$ being equal to 40, 80 and 200, respectively (cf. FIG. 5). The medium 3 is a Yb:YAG crystal fibre of 700 μm in diameter, 50 mm long and 1% doped with $Yb^{3+}$ ions. The pump power is fixed to 200 W and a pump waist size in the gain medium of 200 μm (cf. FIG. 5).

The curves of effective gain $G_{eff}$ for various pump-beam quality factors in a system according to the invention are compared to that of a conventional amplifier with a uniform pumping guided over the whole length of the amplifying medium (curve AA in FIG. 5).

Figure 6:
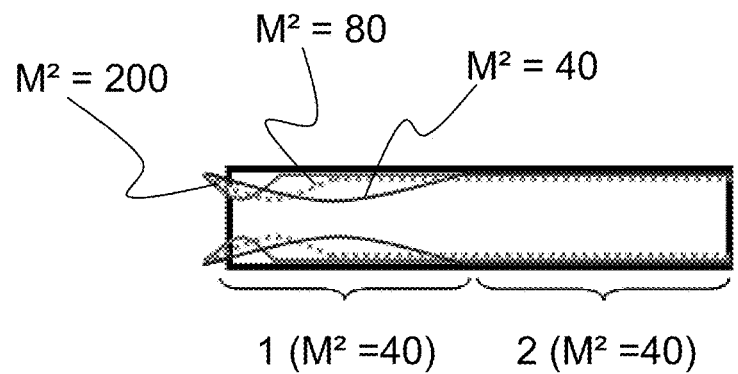
FIG. 6 shows various schemes of coupling of the pump wave in the amplifying medium, corresponding to various factors of quality of the pump wave.

A detailed representation of the pumping scheme is given in FIG. 6, for three values of the pump-beam quality factor: respectively $M^2$ equal to 40, 80 and 200. It is noted that the length of the pre-amplification area 1 depends directly on the pumping configuration used. However, as mentioned hereinabove, the length of the medium 3 is greater than a few centimeters in order to distribute at best the thermal load. Moreover, if the brightness of the pumping system is very good (low $M^2$), the total length of the gain medium 3 is increased by the length to preserve the good thermal distribution. Beyond a few centimeters of propagation length, the pump wave 6 ends up being guided, and hence the medium 3 still comprises two well-distinct operating areas 1 and 2 (cf. FIG. 6). This brightness property of the pump beam 6 influences not only the length of the pre-amplification area 1, but also the pump power density that can be coupled in this area and thus the gain available in the medium 3. Indeed, as can be seen in FIG. 5, the beam quality of the pumping system plays an essential role. The evolution of the curves of the quality factor $M^2$, equal to 40, 80 and 200, respectively, indicates that a reduction of brightness (high $M^2$) generates a reduction of the gain and of the output power obtained. Besides, it is noted that, even in the case of a low brightness of the pump beam ($M^2 \sim 200$), the curve of effective gain is higher than a curve of gain corresponding to a homogenized pumping.

As a conclusion, the dimensioning of the amplification system of the invention depends on the combination of two sub-systems (the gain medium 3 and the pumping scheme) to achieve the best possible results.

Figure 4:
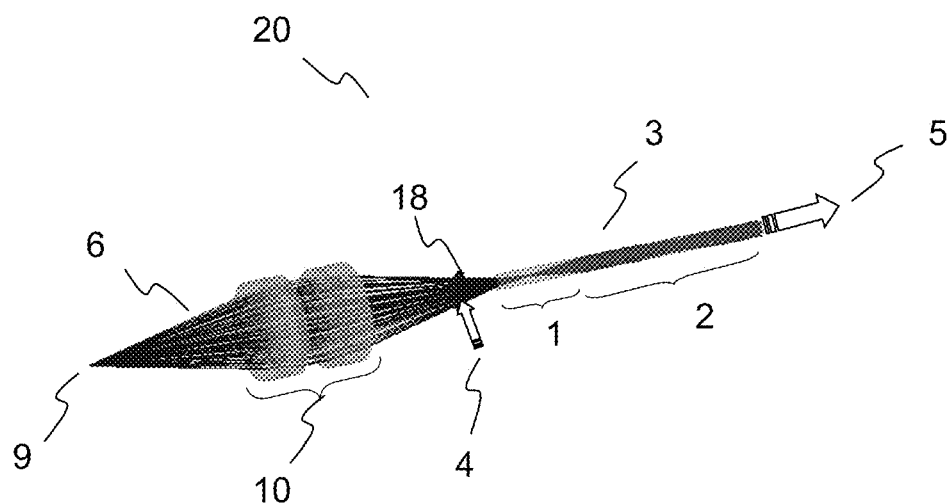
FIG. 4 is a projection of a 3D view of a representation of rays of the pump source in an amplifier system according to the invention.

In a first exemplar embodiment of the invention, the pumping is performed by means of a fibred laser diode of 200 μm of core diameter (corresponding to a quality factor $M^2=40$) and 200 W of maximal power. An optical system 10 forms the image of the output of the pump-carrying optical fibre inside the amplifying medium 3: the pump wave is focused to 7 mm from input face, with a pump waist diameter of 200 μm. FIG. 4 schematically shows the components of this embodiment, as well as a representation of rays of the pump beam through the system. The beam to be amplified 4 is coupled in the medium 3 by means of a semi-reflecting mirror 18. The amplified beam 5 is extracted after a single passage through the areas 1 and 2 of the medium 3.

Figure 7:
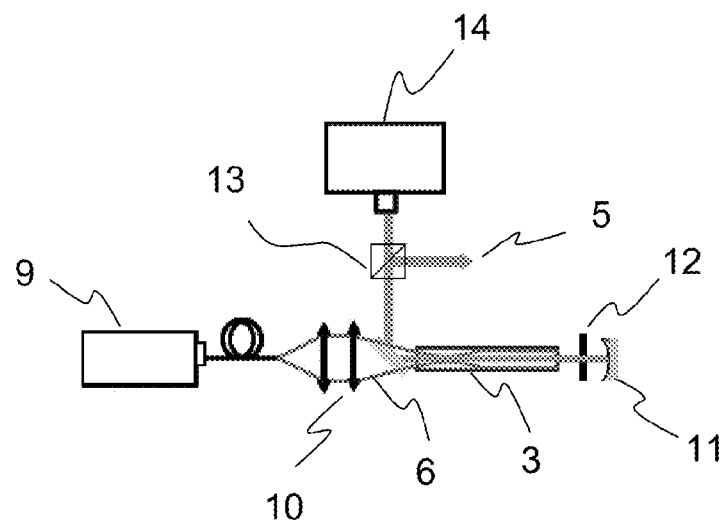
FIG. 7 shows a first example of application of the invention in a nanosecond pulse amplifier, in which the gain medium is a Nd:YAG single-crystal fibre.

An application of the invention relates to a nanosecond microlaser pulse amplifier. The system is schematically shown in FIG. 7. An oscillator 14 emits pulses of less than 1 nanosecond (800 picoseconds), at a wavelength of 1064 nm and with an average power of the order of 100 mW. The gain medium 3 comprises a 0.25% doped Nd:YAG monocrystalline fibre of 1 mm in diameter and 50 mm long. A fibred pump diode 9 is focused in a first area 1 of the gain medium 3. The system can operate with a single passage of the pulses through the medium 3 or with two passages (a round trip). In the case illustrated in FIG. 7, the pulses run through the medium 3 by doing a first passage in the medium 3. A reflecting mirror 11 and a quarter-wave plate 12 make the amplified signal 5 do a second passage in the medium 3 before being extracted, for example by means of a polarisation separator cube 13. This system makes it possible to obtain average output powers higher than several watts, with a gain higher than 10 for a single passage.

The system of the invention has the advantage that it is simple with respect to the prior systems. Its possibilities of power increase are not restricted by thermal effects, by undesirable non-linear effects or by the energy resistance of the material.

A second example of application relates to the use of an amplifier system according to the invention in the last amplifying stage of a pulsed high power laser with ultra-short (shorter than one picosecond or even than hundred femtoseconds) and high-energy pulses.

Figure 8:
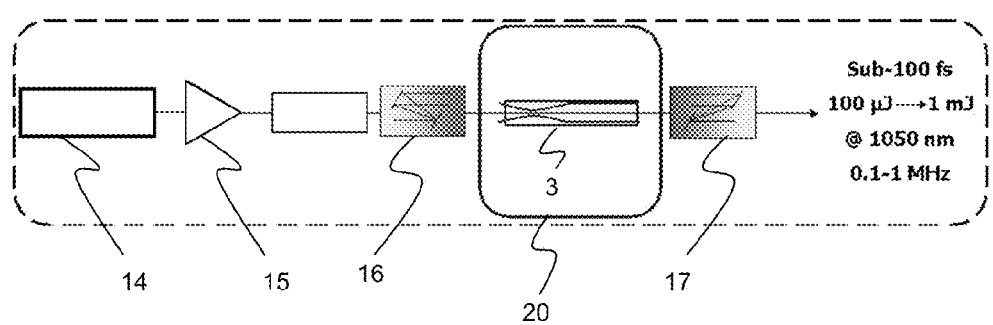
FIG. 8 shows a second example of application of the invention to a high-energy ultra-short pulse amplifier, in which the gain medium is an Ytterbium-doped single-crystal fibre.

FIG. 8 shows a laser chain comprising an oscillator 14 delivering low-average-power femtosecond pulses, amplified through a pre-amplifier 15, a stretcher 16, an amplifier system 20 according to the invention and a compressor 17. The amplifier system 20 of the invention herein replaces an amplifying medium in a conventional scheme of chirped pulse amplification. The very-high-gain medium 3 may be a very-wide-core fibre or an ytterbium-doped single-crystal fibre in order to permit reaching very high energy levels (several hundreds of μJ for sub-femtosecond pulses). The system is not limited by the non-linear effects as in the doped-glass-fibre amplifiers. The configuration of the amplifier is also relatively simple, compared to the complex systems based on titanium-doped sapphire crystals.

Figure 9:
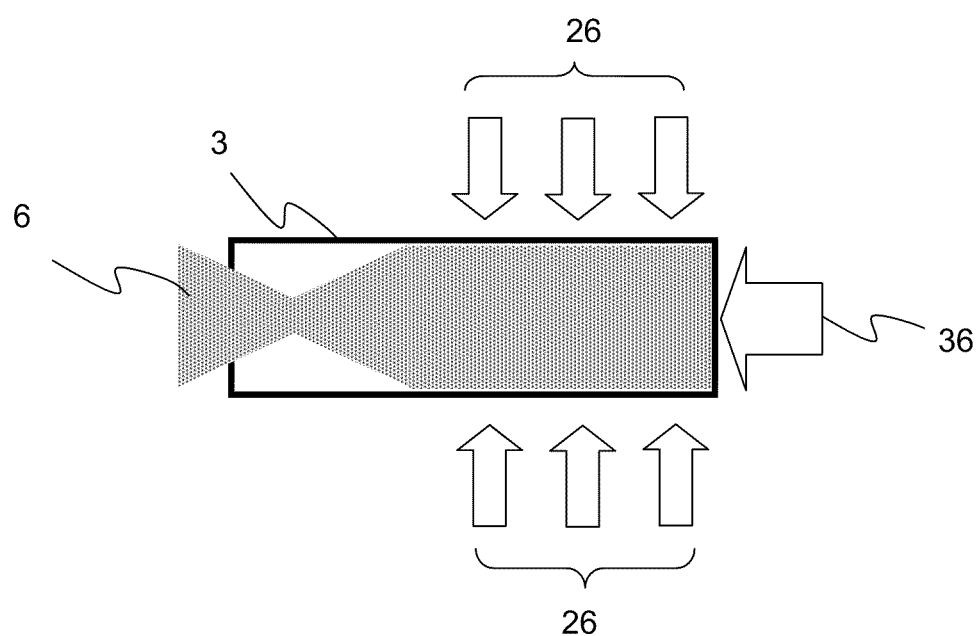
FIG. 9 shows a view in longitudinal section of the gain medium according to a particular embodiment in which a pump wave is coupled according to the invention in a guiding gain medium, and in which a transverse or contra-propagative longitudinal pump wave is coupled in the amplification area of the gain medium.

FIG. 9 shows a scheme of pumping of the gain medium according to a particular embodiment of the invention. The main pump wave 6 is coupled according to the invention in the area 1 of the guiding gain medium 3 as described above. According to this embodiment, an auxiliary pump wave is used to pump the amplification area of the gain medium, in a transverse manner (26) and/or in a longitudinal and contra-propagative manner (36).

The invention makes it possible to increase both the gain and output power performances of an amplifier. The high values of effective gain as well as high output powers can be obtained.

The invention hence simplify the making of amplifiers, by combining the functions of pre-amplification and amplification-extraction in a single and same amplifying medium.

The invention uses the particular geometry of a guiding gain medium for the pump wave, which permits to inject a good-quality pump wave, in order to make a hybrid-operation medium that makes it possible to obtain both high gain and efficient extraction properties.

According to the invention, the beam performs only one passage, or two passages, at most, in the gain medium, and the amplifying area is thus probed only two times at most.

The invention thus makes it possible to considerably increase the gain values intrinsic to the medium thanks to a pump beam coupling geometry that permits the use of two well-distinct gain areas, as in a single medium. Therefore, the performances in terms of effective gain and output power are simultaneously improved by a factor that can be high.

The invention provides an optical amplifier system that makes it possible to go beyond the thermal limitations of the crystal amplifiers and beyond the domains of occurrence of the non-linear effects and the damage thresholds of the doped glass fibres, while being simple to implement.

The invention claimed is:

1. An optical amplifier system 20 for pulsed laser with short or ultra-short and energetic pulses, comprising:
    an optical pumping source able to generate a pump wave 6;
    an elongate amplifying medium 3 comprising an input interface 7 able to receive an optical signal 4 to be amplified, said medium 3 being able to amplify said optical signal 4 propagating along said amplifying medium and able to extract an amplified signal 5; and
    an optical system 10 able to couple the pump wave 6 in the amplifying medium 3 so as to pump said amplifying medium 3 longitudinally,
    wherein:
    the amplifying medium 3 is a rotationally symmetric gain medium or a fiber able to guide said pump wave, said pump-guiding medium 3 having a minimum transverse dimension $\phi_3$ greater than 50 microns and equal to or less than 2000 microns, at the input interface 7,
    the optical system 10 is able to focus the pump wave 6 inside the gain medium 3, said focused pump wave having a transverse dimension $\phi_6$ smaller than the minimum transverse dimension $\phi_3$ and a numerical aperture smaller than the numerical aperture of the amplifying medium 3, in such a way that said pump wave propagates freely over a part 1 of the amplifying medium 3, and that said pump wave 6 propagates in a confined manner over a part 2 of the amplifying medium, by total internal reflections.

2. The system according to claim 1, wherein the amplifying medium 3 is a solid medium doped with rare earth or metal ions.

3. The system according to claim 1, wherein the amplifying medium 3 comprises an elongated cell containing a gas able to amplify the optical signal 4 by optical pumping.

4. The system according to claim 1, wherein the amplifying medium 3 comprises an elongated cell containing a liquid comprising particles or molecules able to amplify the optical signal 4 by optical pumping.

5. The system according to claim 1, wherein the amplifying medium 3 comprises a core and a clad, the optical signal 4 to be amplified propagating in the core of the medium 3.

6. The system according to claim 1, wherein the optical pumping source and the optical system 10 are able to focus the pump wave 6 in such a manner that said pump wave propagates freely over a length greater than 1 mm of the medium 3.

7. The system according to claim 1, wherein the system further comprises a second optical pumping source able to generate a second pump wave (26, 36), able to optically pump the part 2 of the amplifying medium 3, transversally to the axis of propagation of the signal to be amplified or in a longitudinal and contra-propagative manner with respect to the axis of propagation of the signal to be amplified.

8. The system according to claim 1, wherein the signal to be amplified performs no more than two passages in the amplifying medium 3.

9. A pulsed laser comprising an oscillator 14 able to emit pulses to be amplified, said laser comprising an amplifier system according to claim 1.

10. The system according to claim 2, wherein amplifying medium 3 comprises a core and a clad, the optical signal 4 to be amplified propagating in the core of the medium 3.

11. The system according to claim 2, wherein the optical pumping source and the optical system 10 are able to focus the pump wave 6 in such a manner that said pump wave propagates freely over a length greater than 1 mm of the medium 3.

12. The system according to claim 2, wherein the system further comprises a second optical pumping source able to generate a second pump wave (26, 36), able to optically pump the part 2 of the amplifying medium 3, transversally to the axis of propagation of the signal to be amplified or in a longitudinal and contra-propagative manner with respect to the axis of propagation of the signal to be amplified.

13. The system according to claim 2, wherein the signal to be amplified performs no more than two passages in the amplifying medium 3.

14. The system according to claim 1, wherein the part 1 is a preamplification area and the part 2 is a power amplification and extraction area.

15. The system according to claim 1, wherein the amplifying medium is a monocrystalline fiber.

16. The system according to claim 1, wherein the amplifying medium is a doped monocrystalline fiber.

17. The system according to claim 1, wherein the amplifying medium is a doped Yb:YAG monocrystalline fiber.

\* \* \* \* \*

UNITED STATES PATENT AND TRADEMARK OFFICE
CERTIFICATE OF CORRECTION

PATENT NO.        : 8,625,192 B2                                          Page 1 of 1
APPLICATION NO. : 13/124440
DATED             : January 7, 2014
INVENTOR(S)       : Balembois et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 252 days.

Signed and Sealed this
Twenty-second Day of September, 2015

Michelle K. Lee
*Director of the United States Patent and Trademark Office*